M. S. BROOKS.
SLEIGH-RUNNERS FOR WHEEL-VEHICLES.
No. 171,767. Patented Jan. 4, 1876.
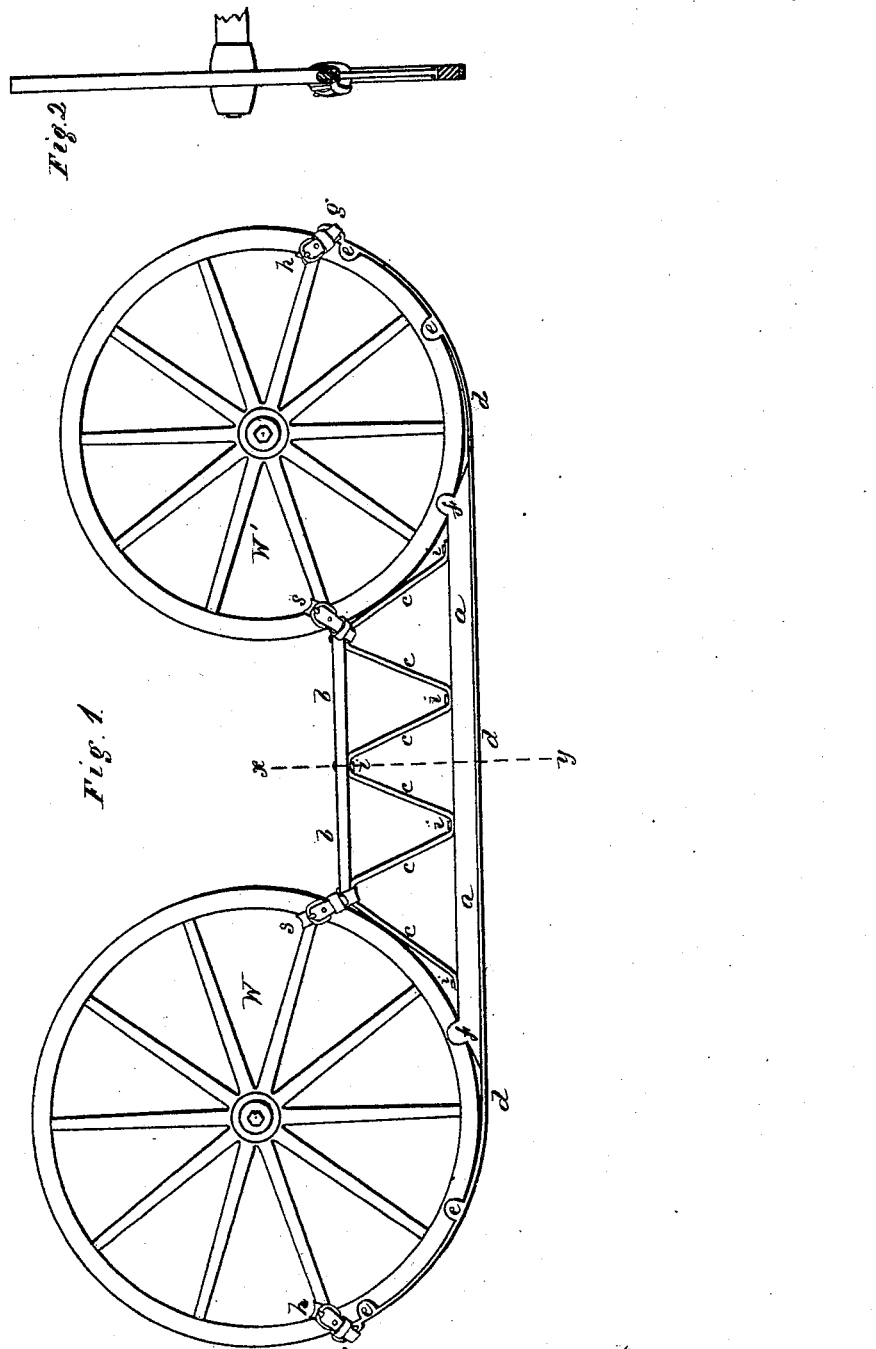
Witnesses.  
Elliot Hallbrook  
John T. Peters
Inventor.  
Merritt S. Brooks.  
by Theo. G. Ellis, Attorney

UNITED STATES PATENT OFFICE.

MERRITT S. BROOKS, OF CHESTER, CONNECTICUT.

IMPROVEMENT IN SLEIGH-RUNNERS FOR WHEEL VEHICLES.

Specification forming part of Letters Patent No. 171,767, dated January 4, 1876; application filed May 15, 1875.

*To all whom it may concern:*

Be it known that I, MERRITT S. BROOKS, of Chester, in the county of Middlesex and State of Connecticut, have invented certain new and useful Improvements in Sleigh-Runner Attachments for Wheel Vehicles; and I do hereby declare that the following is a full, clear, and exact description thereof, whereby a person skilled in the art can make and use the same, reference being had to the accompanying drawings and to the letters of reference marked thereon.

Like letters in the figures indicate the same parts.

My invention relates to those attachments which are usually placed between and under the wheels on each side of four-wheeled vehicles, to convert them into sleighs suitable for running upon snow.

My invention consists in an improved construction of the part inserted between the wheels to form the runner, as will be hereinafter described.

In the accompanying drawing, Figure 1 is a side view of my improved runner attached to the two wheels on one side of a vehicle. Fig. 2 is a section upon the line $x\ y$, showing the parts beyond.

W W' are the wheels of a vehicle on one side, in their ordinary position, between which the attachment is shown. $a$ is a bottom bar, usually of wood. $b$ is a top bar of the same material. $c$ is a metallic triangular bracing, consisting of an iron rod bent to the proper form, and secured at its ends and angles to the bars $a$ and $b$ by bolts $i\ i$, as shown in the drawing. $d$ is an iron strap bolted to the bar $a$, and extending out beyond it partly around the wheels W W'. It is furnished with clips $e\ e$, for holding it in place upon the wheel, and has loops $g$, through which are passed the straps $h$, for firmly fastening the ends of the bar to the wheels. The bar $a$ is of such a length on the top side that, when it is inserted between the wheels, it raises them slightly above the line of the bottom of the bar. This gives an easier curve for the strap $d$ under the wheels, and prevents the greater wear usually occurring at this point. The clips $f$ hold the wheels securely upon the ends of the bar $a$.

$s\ s$ are straps for securing the wheels to the upper corners of the intermediate runner, and hold it more securely in place.

What I claim as my invention is—

The combination of the frame $a\ b\ c$ with the wheels W W', when arranged to lift the wheels slightly above the bottom of the frame, substantially as herein described.

MERRITT S. BROOKS.

Witnesses:
SOCRATES DENISON,
J. K. DENISON.